United States Patent [19]

Farronato et al.

[11] Patent Number: 4,480,008

[45] Date of Patent: Oct. 30, 1984

[54] SOLID POLYMER BINDERS FOR THERMOSETTING POWDER COATING COMPOSITIONS, POWDER COATING COMPOSITIONS CONTAINING THESE BINDERS AND METAL OBJECTS COATED WITH THESE COATING COMPOSITIONS

[75] Inventors: Silvestro Farronato, Romano d'Ezzelino; Sergio Gazzea, Bassano del Grappa, both of Italy

[73] Assignee: Hoechst Aktiengesellschaft, Fed. Rep. of Germany

[21] Appl. No.: 478,450

[22] Filed: Mar. 24, 1983

Related U.S. Application Data

[63] Continuation-in-part of Ser. No. 337,389, Jan. 6, 1982, abandoned.

[30] Foreign Application Priority Data

Jan. 8, 1981 [IT] Italy ............................ 19042 A/81

[51] Int. Cl.$^3$ .................. B32B 27/40; B05D 3/02
[52] U.S. Cl. .................. 428/425.8; 427/385.5; 427/386; 427/388.1; 427/388.2; 427/27; 427/195; 428/423.1; 528/45; 528/65; 528/85
[58] Field of Search ................. 528/45, 65, 85; 427/388.1–388.2, 27, 195, 386; 428/425.8, 423.1

[56] References Cited

U.S. PATENT DOCUMENTS

| | | | |
|---|---|---|---|
| 3,711,571 | 1/1973 | Farah | 528/45 X |
| 3,846,378 | 11/1974 | Griswold | 8/115.6 X |
| 4,252,923 | 2/1981 | König et al. | 525/452 |

*Primary Examiner*—Thurman K. Page
*Attorney, Agent, or Firm*—Charles A. Muserlian

[57] ABSTRACT

A solid polymer binder for thermosetting powder coating compositions obtained by combining (A) a polyurethane prepolymer containing carboxyl groups and derived from polyisocyanates, hydroxycarboxylic acids and blocking agents different from oximes, containing 1 to 40% by weight of blocked isocyanate groups and having an acid number of 1 to 80, with (B) at least one homo- and/or heterofunctional compound which either contains hydroxyl groups or is capable of forming them by reaction, component (B) being present in an amount such that cross-linked products are formed under stoving conditions, in which the content of COOH-groups is not higher than 1.5% referred to the weight of components (A) and (B), a thermosetting powder composition containing such binder, a metal object coated with such thermosetting powder coating composition, and a process for the manufacture of coatings on metal substrates with such powder coating composition.

15 Claims, No Drawings

SOLID POLYMER BINDERS FOR THERMOSETTING POWDER COATING COMPOSITIONS, POWDER COATING COMPOSITIONS CONTAINING THESE BINDERS AND METAL OBJECTS COATED WITH THESE COATING COMPOSITIONS

This application is a continuation-in-part of application Ser. No. 337,389, filed Jan. 6, 1982 now abandoned.

The invention relates particularly to solid polymer binders which are suitable for the preparation of thermosetting powder coating compositions, obtained by reacting polyurethane prepolymers containing carboxyl groups and having blocked isocyanate groups with at least one other compound which contains one or more of the following functional groups: hydroxyl, epoxide, carboxyl or anhydride, i.e. a homofunctional or heterofunctional compound.

In this specification, "homofunctional" denotes a compound capable of reacting with blocked isocyanates and having a single type of functional groups, i.e. hydroxyl or epoxide. "Heterofunctional" on the other hand relates to a compound capable of reacting with blocked isocyanates and having different functional groups which occur together in the molecule, at least one of which being epoxide and/or hydroxyl in addition to e.g. carboxyl and/or anhydride groups. Suitable compounds are e.g. compounds with epoxide and hydroxyl, carboxyl and hydroxyl, hydroxyl on the one hand and carboxyl and/or anhydride on the other hand, etc. This invention further relates to thermosetting powder coating compositions wherein the binder consists of one or more solid polymer binders according to the invention.

As is well known, powder coating compositions were developed in the United States of America in the sixties and were used primarily for coating the interiors of tubes or pipes, the coating being applied in a layer thickness of up to 300 μm. However, the main impetus to the development and use of these compositions came from Europe, where in 1966 the first plant for the electrostatic application of powder coating compositions was started up in the Federal Republic of Germany.

Economic and ecological factors such as energy conservation and staff reductions, reduction of losses and environmental pollution spurred the researchers on to find new fields of application for these compositions and to improve their properties and reduce their disadvantages. At present, powder coating compositions are used for coating the interiors of pipes for conveying petroleum products and other liquid or gaseous products, these pipes being commonly known as pipelines, and also for painting the bodywork of cars by the "Revers" method, and as a lacquer coating for metal closures, metal furniture, bicycles, sewing machines and other metal objects. It has been proposed that powder coating compositions be used in the production of insulated electrical wires and for painting domestic electrical appliances. However, they have not hitherto given satisfactory results in this field.

The advantages presented by the powder coating compositions are of various kinds: they are economical, safe, environmentally acceptable and technically satisfactory. To be more specific, the following comments may be made:

Manual application does not require the use of specialist staff and may even be automated. The energy consumption for the application of powder coating compositions is less than with liquid coating compositions, since the powder lacquer compositions do not contain either organic solvents or water which have to be evaporated during stoving. Thanks to the absence of flammable solvents, the insurance premiums for plants in which powder coating compositions are used are significantly lower than for plants where solvent-based paints are used. The environmental pollution is also virtually nil, since only very small amounts of powder can pass into the atmosphere if an adequate system for separating and recovering the powder material is provided. The working conditions are healthier since there are no solvent vapours or foul smells.

Moreover, no drying times need be allowed for the coatings. The coated article is taken directly to the stoving oven, thus shortening the coating operation. As there is no solvent which has to be evaporated and consequently no losses occur as a result of vaporisation of the solvent, it is possible to obtain a uniform film of coating with only one application, even if the coating is relatively thick. Moreover, any irregularities on the surface, as well as the corners and edges, are coated more satisfactorily. Furthermore, the porosity of the film of powder coated composition is much lower, and this leads to an improvement in the chemical and mechanical resistance.

Other properties peculiar to the powder coating composition arise from the fact that the product is ready for use without any need for the user to check or correct the viscosity, and also by virtue of the fact that any defects in the coating can easily be rectified before the stoving in the oven.

Powder coating compositions have only a few disadvantages compared with conventional thermosetting solvent-based coating compositions. These are as follows: the changeover to another colour is very much more laborious in plants having only one cabin or compartment; no colours can be produced by mixing two or more coating compositions together and these compositions cannot be used for coating box-shaped articles.

Thermosetting powder coating compositions for application by the dust flow process (whirl-sintering process), by electrostatic spraying and subsequent hardening of the film of coating by heating are known from DD-PS No. 55 820. According to this German patent, the coating compositions are produced from pulverulent mixtures of polyesters containing hydroxyl groups and polyisocyanates blocked with phenol. As is well known, the use of phenol for blocking the isocyanate groups has serious drawbacks for the working environment. Moreover, the reactivity of these products is not always sufficient, even in the presence of catalysts, with the result that the formation of bubbles in the film of coating and other flow defects may occur, jeopardising the formation of a satisfactory surface of the coating.

From German Offenlegungsschrift No. 20 47 718, binders containing urethane groups and carboxylic acid ester groups are known, as binders for coating compositions, particularly powder coating compositions, and contain, in addition to active hydrogen atoms capable of reacting with isocyanates, isocyanate groups blocked with ε-caprolactam, and can be cross-linked by heating to temperatures above about 140° C., preferably from 170° C. to 210° C. The binders obtained according to this German Offenlegungsschrift differ from the previously known binders by their better flow properties, irrespective of the method of application. In the case of powder coating compositions, the above-mentioned binders have a further advantage over isocyanates blocked with phenol (see DD-PS No. 55 820), in that they do not split off any phenols and thus do not lead to environmental pollution, not least at the place of work.

However, owing to the fact that they are obtained by reacting polymers containing exclusively free hydroxyl groups with blocked polyisocyanates, the binders known from the German Offenlegungsschrift require a considerable quantity of blocked polyisocyanates and thus liberate a substantial amount of ε-caprolactam or other blocking agents during the stoving operation. Moreover, their chemical resistance is unsatisfactory. This can be put down to the low density of cross-linking of the cured coating film, since during the stoving operation cross-linking occurs only between the isocyanate and hydroxyl groups and consequently an insufficient degree of cross-linking is obtained, leading to limited chemical resistance.

From German Offenlegungsschrift No. 2 708 611, a process for preparing polyurethane prepolymers containing carboxyl groups and blocked isocyanate groups is known. This application also describes the use of these prepolymers for the preparation of polymer binders for thermosetting coating compositions, which may be used either in aqueous solutions, aqueous dispersions, in non-aqueous solutions or without a solvent (naturally only when the binder itself is liquid) or finally in powder form. Certainly, the binders prepared according to this Offenlegungsschrift do not yield powder coating compositions of satisfactory quality in reality since, as they are primarily intended as water-soluble products, the carboxyl groups in the polyurethane prepolymers predominate over the epoxy groups and therefore the carboxyl groups which are still free after the stoving operation are highly susceptible to chemical attack.

The aim of this invention is therefore to provide solid polymer binders for powder coating compositions which do not have the above-mentioned disadvantages of the known binders and which make it possible to produce thermosetting powder coating compositions which can easily be applied by the conventional techniques, e.g. by the whirl-sintering process or by spraying in an electrical field (electrostatic powder spraying process=EPS process), and which yield flawless, smooth, glossy coatings having excellent adhesion, outstanding mechanical properties, high chemical resistance and resistance to weathering.

A further object of this application is to provide thermosetting powder coating compositions which, in addition to being used generally for coating metal objects, are particularly suitable for painting domestic electrical appliances, metal wires and particularly electric conductors.

These and other aims of this invention are clear from the description and the examples which follow.

The solid polymer binders according to the invention are obtained by combining (A) a polyurethane prepolymer containing carboxyl groups, derived from polyisocyanates, hydroxycarboxylic acids and blocking agents which are different from oximes, this prepolymer containing 1 to 40, preferably 7 to 20% by weight of blocked isocyanate groups and having an acid number (SZ) of from 1 to 80, preferably 5 to 80, with (B) at least one homo- and/or heterofunctional compound which either contains hydroxyl groups or is capable of producing them by reaction, e.g. of carboxyl with epoxide groups, component (B) being present in an amount such that cross-linked products are formed under stoving conditions. The content of COOH-groups in the cross-linked product should be not higher than 1.5, more preferably not higher than 1.0 and most preferably be not higher than 0.718%, referred to the weight of components (A) and (B). In other words, the reaction of the three components to form the prepolymer is effected so that the unblocked isocyanate groups are substantially compensated by hydroxyl groups, e.g. to a residual content of not more than 0.5% by weight of free NCO. The blocked isocyanate groups are then reacted, under the conditions of stoving, with any remaining free hydroxyl groups or hydroxyl groups formed from e.g. carboxyl and epoxide groups under the conditions of stoving.

In particular, these binders may be obtained by the following combinations:

prepolymer+compounds containing epoxy groups
prepolymer+compounds containing epoxy groups+compounds containing hydroxyl groups
prepolymer+compounds containing epoxy groups+compounds containing carboxyl groups
prepolymer+compounds containing epoxy groups+compounds containing hydroxyl groups+compounds containing carboxyl groups
prepolymer+compounds containing epoxy groups+compounds containing hydroxyl groups+compounds containing anhydride groups
prepolymer+compounds containing hydroxyl groups+compounds containing carboxyl groups+compounds containing anhydride groups
prepolymer+compounds containing hydroxyl groups+compounds containing anhydride groups
prepolymer+compounds containing epoxy and hydroxyl groups
prepolymer+compounds containing epoxy groups+compounds containing anhydride and carboxyl groups
prepolymer+compounds containing hydroxyl and carboxyl groups and generally prepolymer+homofunctional compound+heterofunctional compound.

Preferably the prepolymers are reacted with homo- and/or heterofunctional compounds containing groups which are capable of reacting with carboxyl groups without formation of volatile compounds.

In this specification, the term "prepolymer" denotes a polyurethane prepolymer containing carboxyl groups and blocked isocyanate groups. The composition of this prepolymer is explained in more detail hereinafter.

The prepolymers suitable for the preparation of the solid polymer binders according to the invention are obtained, for example, by the method described in German Offenlegungsschrift No. 2 708 611, wherein an isocyanate comprising at least two free isocyanate groups in its molecule is reacted with a hydroxycarboxylic acid and a blocking agent, i.e. another compound containing active hydrogen and capable of reacting with an isocyanate group, according to the reaction scheme

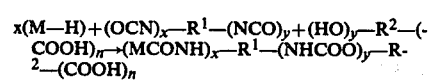

wherein M—H is a compound containing an active hydrogen atom capable of reacting with an isocyanate, $R^1$ and $R^2$ are identical or different aliphatic, cycloaliphatic or aromatic groups and x, y and n are identical or different integers in the range from 1 to 15, preferably from 1 to 10, and the sum of which is at most 30, preferably at most 15. This reaction should be effected so that at least oligomeric products which are virtually free from hydroxyl groups are formed from the polyisocyanate and the hydroxycarboxylic acid.

As starting products for the polyurethane prepolymers, it is possible to use conventional polyisocyanates such as 2,4- or 2,6-toluylenediisocyanate, xylylenediisocyanate, diphenylmethane.4,4'-diisocyanate, triphenylmethyl-4,4',4''-triisocyanate, polyphenylpolymethyl-isocyanate, isophoronediisocyanate, hexamethylenediisocyanate, 2,2,4(2,4,4)-trimethylhexamethylenediisocyanate, methylcyclohexyldiisocyanate, dicyclohexylmethyldiisocyanate, diethylfumarohexylisocyanate, bis-(3-methyl-4-isocyanatocyclohexyl)-methane, 2,2-bis-(4-isocyanatocyclohexyl)-propane, the methyl ester of lysine diisocyanate, the biuret of hexamethylenediisocyanate, diisocyanates of dimeric acids, 1-methyl-benzene-2,4,5-triisocyanate, biphenyl-2,4,4'-triisocyanate, the triisocyanate obtained from 3 mol of hexamethylenediisocyanate and 1 mol of water containing 16% NCO and other compounds containing at least two NCO groups per molecule.

As hydroxycarboxylic acids, compounds are used containing at least one —OH and one —COOH group per molecule, such as glycolic acid, salicylic acid, tartaric acid, p-hydroxybenzoic acid, dimethylolpropionic acid, malic acid, ricinoleic acid, phenylglycolic acid, 4,4-bis-(4-hydroxyphenyl)-pentanoic acid and so on.

As blocking agents M—H, it is possible to use, for example, compounds containing an active hydrogen atom, such as phenol, 2,4-diisobutylphenol, pyrocatechol, cresol, isooctylphenol, p-tert.butylphenol, phenylphenol or cyclic compounds with a —CO—NH group such as α-pyrrolidone, piperidone-2, ε-caprolactam, ethylmalonate, ethylacetoacetate, 1-phenyl-3-methyl-5-pyrazolone, diphenylamine, acylmercaptans, aliphatic mercaptans, 4-hydroxydibenzyl, 6-hydroxytetrahydronaphthalene, monohydric alcohols with 1 to 6 carbon atoms such as methanol, ethanol, n- and isopropanol, the various butanols, pentanols and hexanols, tertiary monoalcohol amines such as dimethylethanolamine, diethylethanolamine, dimethylisopropanolamine, 3-dimethylaminopropanol, 1-diethylaminobutanol-2, diisopropylethanolamine, ethyloxyethylaniline, N,N-dimethyl-meta-aminophenol, N,N-diethyl-meta-aminophenol, 1,3-bis-(dimethylamino)-2-propanol, 4,4-bis-(dimethylamino)-benzhydrol, aziridine ethanol, N-β-hydroxyethylmorpholine, N-β-hydroxyethylpyrrolidine, 3-hydroxy-N-methylpiperidine, 4-hydroxy-N-methylpiperidine, N-hydroxypiperidine and so on.

The simultaneous presence of two heterofunctional groups in the molecule of the prepolymer, i.e. the carboxyl groups and blocked isocyanate groups, makes this prepolymer exceptionally adaptable to the technical requirements, since both functional groups participate in the cross-linking reaction and lead to polymers with a strongly marked three-dimensional structure with a higher density of cross-linking.

According to the invention, the polymer binders suitable for the preparation of powder coating compositions and based on prepolymers may be prepared by using the following compounds, for example, as partners in the cross-linking reaction:

(B,A) Saturated or unsaturated, aliphatic or cycloaliphatic, aromatic or heterocyclic epoxy compounds. Preferred epoxy compounds are:

(1) Poly-(epoxyalkyl)-ethers of aliphatic or cycloaliphatic polyhydroxy compounds, such as those of trimethylolethane, trimethylolpropane, tris(hydroxyethyl)-isocyanurate, glycerol or pentaerythritol.

(2) Reaction products of epihalohydrins, such as epichlorohydrin, with monomeric polyhydric phenols such as 2,2-bis(4-hydroxyphenyl)-propane, 1,1-bis(4-hydroxyphenyl)-ethane, bis(4-hydroxyphenyl)-methane, 4,4'-dihydroxydiphenylsulphone, hydroquinone, resorcinol, dihydroxydiphenyl, dihydroxynaphthalene and also triglycidylisocyanurate.

(3) Glycidylethers of polyvalent phenolic compounds such as novolaks and resols, obtained by condensation of phenols and/or cresols with formaldehyde.

(4) Polyglycidyl esters of polycarboxylic acids such as diglycidyl esters of phthalic acid, isophthalic acid, terephthalic acid, tetrahydrophthalic acid, hexahydrophthalic acid or polyglycidyl esters derived from polyesters or compounds having free carboxylic acid groups.

(5) Solid acrylic resins with glycidyl groups.

(B,B) Compounds with more than one free hydroxyl group, such as saturated or unsaturated polyesters, polyethers, hydroxylated alkyd and acrylic resins, pentaerythritol, trimethylolethane or -propane, glycerol, lactones, polylactones.

(B,C) Carboxyl compounds with more than one free carboxyl or anhydride group, such as saturated or unsaturated polyesters, alkyd resins and acrylic resins, however used conjointly with compounds listed sub B,A and/or B,B.

The solid polymer binders according to the invention are better than the known binary binders, from both the chemical and mechanical point of view, precisely because of the chain-forming reaction between the two or more components from which the solid polymer binder according to the invention is formed.

The coating compositions obtained with the solid binders according to the invention may contain, in addition to dyes or pigments of organic and/or inorganic nature such as white pigments, particularly titanium dioxide, or non-white pigments such as lead molybdate, lead chromate, the various iron oxides (yellow, brown or black), carbon black etc., one or more of the conventional additives used in the preparation of powder coating compositions, such as fillers, e.g. barium sulfate, calcium carbonate, kaolin or mica, flow agents, oxidation inhibitors, etc. In order to reduce the stoving time and stoving temperatures, accelerators and catalysts may be used, such as zinc naphthenate and octoate, tin octoate, dibutyl-tin-dilaurate, lithium benzoate and hydroxide, tin and zinc chloride, titanium, vanadium and zirconium alcoholates, metal salts of organic carboxylic acids, quaternary ammonium and phosphonium salts, salts of phosphoric acid, amines and amidines, substituted and unsubstituted ureas and polyureas, pyrazolones, pyrimidines, imidazole and the derivatives thereof. Other additives include, for example, aromatic diketones such as benzoin, which prevent point decomposition and thus suppress pore formation. These additives are generally used in amounts of from 0.1 to 3, preferably from 0.2 to 2% by weight, based on the binder.

The powder coating compositions prepared with the solid polymer binders according to the invention may be produced using the conventional mixing apparatus, such as extruders, double-Z mixers and the like, by combining the above-mentioned polymeric prepolymers with additional cross-linking agents and, if desired, the conventional additives used in the paint industry, such as pigments, flow agents, thixotropic agents, fillers and catalysts (see above).

The powder coating compositions obtained with the solid polymer binders according to the invention may easily be applied by the conventional methods, such as the whirl-sintering method or electrostatic powder spraying, and subsequently stoving the coating at temperatures of over 100° C., preferably 140° to 220° C., to obtain a coating with excellent mechanical properties and very good chemical resistance and weathering qualities. Even if one or more products contained in the binder according to the invention is not present in solid form, it is important that the thermosetting powder coating compositions should be powdery after homogenisation, grinding and screening, and should not stick together and go lumpy during storage. The powder coating compositions according to the invention meet these requirements perfectly.

The following Examples illustrate the invention. "Parts" always refers to "parts by weight". The impact strength was determined according to ASTM D 2794 in inches×pounds. In all the Examples, the composition is applied to a degreased steel sheet in accordance with UNICHIM, i.e. an Italian standard for the testing of paints. The gloss is determined in each case according to Gardner in %, with an angle of incidence of 60°. Otherwise % are by weight.

EXAMPLES (1) 276 parts of a saturated polyester resin containing carboxyl groups and synthesised from di- and trihydric alcohols and polybasic aromatic and aliphatic carboxylic acids (ALFTALAT VAN 9949/1 of Messrs. Hoechst Sara S.p.A.) with an acid number of about 80, 264 parts of Beckopox VEP 2354, i.e. an epoxy resin obtained from epichlorohydrin and bisphenol A with an epoxy equivalent of about 800, 60 parts of a polyurethane prepolymer containing carboxyl groups and further containing isocyanate groups blocked with $\epsilon$-caprolactam, based on an aliphatic polyisocyanate, with an acid number (SZ) of about 30, about 13.9% NCO and a melting point of about 85° to 90° C. (Indurente 4426 of Messrs. Hoechst Sara S.p.A.), 10 parts of a silicone-free flow agent based on polyacrylate (Additol XL 490, 100%, made by Messrs. Hoechst AG), 4 parts of benzoin, 86 parts of permanent white (barium sulphate) and 300 parts of $TiO_2$-R-85, a rutile-titanium dioxide pigment made by Messrs. TDF-TIOFINE-BV, The Netherlands, were mixed together extremely thoroughly and then homogenised in an extruder at 90° to 100° C. After cooling, the extruded material was ground in a mill and additionally screened, so as to yield powder coating compositions with a particle size of less than 100 μm.

The product thus obtained was applied to a degreased steel sheet with an electrostatic gun at 10 to 90 KV and stoved at 180° C. for 30 minutes. A coating with a thickness of about 60 μm was obtained, with a gloss of more than 90%, excellent flow properties, an elasticity of 8 mm when tested by the Erichsen cupping method, direct and indirect impact strength 160, with good resistance to solvents and with a pencil hardness of 2 to 3H. The stoved product still contained 0.718% carboxyl groups.

(2) 466 parts of a saturated polyester resin containing hydroxyl groups and synthesised from di- and trihydric alcohols and polybasic aromatic and aliphatic carboxylic acids (ALFTALAT VAN 9939/1 made by Messrs. Hoechst Sara S.p.A.) with an OH number of 40 to 60, 124 parts of the polyurethane mentioned in Example 1, 10 parts of PT 810, i.e. a trisglycidylisocyanurate made by Messrs. CIBA GEIGY, Basle (Switzerland), 10 parts of the flow agent used in Example 1, 4 parts of benzoin, 86 parts of permanent white and 300 parts of $TiO_2$-R-85 were processed in the manner described in Example 1. The material thus obtained had excellent chemical and mechanical properties when applied by whirl-sintering to a degreased steel sheet and stoved at 190° C. for 20 minutes. The stoved film did not contain an excess of carboxyl groups.

(3) 500 parts of a saturated polyester resin containing carboxyl groups and synthesised from di- and trihydric alcohols and polybasic aromatic and aliphatic carboxylic acids (ALFTALAT 0131 made by Messrs. Hoechst Sara S.p.A) with an acid number of about 35 and still containing a minor amount of free hydroxyl groups and with a melting point of 75° to 80° C., 80 parts of the prepolymer mentioned in Example 1, 42 parts of PT 810 (see Example 2), 10 parts of the flow agent mentioned in Example 1, 5 parts of benzoin, 85 parts of permanent white and 300 parts of $TiO_2$-R-85 were processed as described in Example 1. The material thus obtained yielded a coating film with excellent chemical and mechanical properties, after application with an electrostatic gun to a degreased steel sheet and after 30 minutes' stoving at 180° C. The stoved film did not contain an excess of carboxyl groups.

(4) 458 parts of a polyester resin with free carboxyl and hydroxyl groups, prepared by reacting a hydroxycarboxylic acid and polyhydric alcohols with aromatic and aliphatic polybasic carboxylic acids (ALFTALAT VAN 0498 made by Messrs. Hoechst Sara S.p.A) with an acid number of about 15, OH number of about 50 and melting point 83° to 85° C., 21 parts of PT 810 (see Example 2), 121 parts of the polyurethane used in Example 1, 10 parts of the flow agent used in Example 1, 85 parts of permanent white and 300 parts of $TiO_2$-R-85 were processed as described in Example 1. After application by means of an electrostatic gun to a degreased steel sheet and after 30 minutes' stoving at 180° C., the material thus obtained produced a smooth, glossy coating film 40 μm thick with excellent adhesion to the metal and with an elasticity of 10 mm according to the Erichsen cupping test. The stoved film did not contain an excess of carboxyl groups.

(5) 270 parts of the saturated polyester resin containing carboxyl groups mentioned in Example 1, 270 parts of the epoxy resin mentioned in Example 1, 40 parts of a polyurethane prepolymer containing carboxyl groups and having isocyanate groups blocked with $\epsilon$-caprolactam, based on an aliphatic polyisocyanate (Indurente 0546 made by Messrs. Hoechst Sara S.p.A) with an acid number of about 10, approximately 15% NCO and a melting point of about 75° to 85° C., 56 parts of a saturated polyester resin with free hydroxyl groups, obtained from di- and trihydric alcohols and aromatic polybasic carboxylic acids (ALFTALAT 0592 made by Messrs. Hoechst Sara S.p.A) with an acid number of about 3 and an OH number of about 50, 4 parts of a silicone-free flow agent based on polyacrylate (Additol VXL 5919 made by Messrs. Vianova Kunstharz AG, Graz, Austria), 5 parts of benzoin and 355 parts of $TiO_2$-R-85 were processed as described in Example 1. After application to a degreased steel sheet with an electrostatic gun at 10 to 90 KV and after 20 minutes' stoving at 180° C., the material thus obtained produces a coating film about 30 μm thick with a gloss of more than 90%, with excellent flow properties, an elasticity of 9.5 mm according to the Erichsen cupping test, direct and indirect impact strength of more than 160, with good resistance to solvents and with a pencil hardness of 2H. The stoved film contained 0.45% of carboxyl groups.

(6) 400 parts of an epoxy resin synthesised from epichlorohydrin and bisphenol A with an epoxy equivalent of 875 to 975, 200 parts of the polyurethane used in Example 1, 10 parts of the flow agent used in Example 5 and 390 parts of TiO$_2$-R-85 were processed as in Example 1. The material thus obtained was applied to a degreased steel sheet with an electrostatic gun and stoved at 200° C. for 30 minutes. A coating film 50 μm thick was obtained, having good flow properties, a gloss of 81%, an elasticity of 7.2 mm according to the Erichsen cupping test, a direct impact strength of 160 and indirect impact strength of 150, a pencil hardness of 2H and good resistance to solvents. The stoved film did not contain an escess of carboxyl groups.

(7) 400 parts of the epoxy resin used in Example 6, 170 parts of the polyurethane used in Example 1, 30 parts of a resin synthesised from polyvalent carboxylic acids and the anhydrides thereof (Additol VXL 1524 made by Messrs. Hoechst AG) with an acid number of about 420 and an anhydride number of 270, 15 parts of the flow agent used in Example 5 and 385 parts of TiO$_2$-R-85 were processed as described in Example 1. The material thus obtained was applied to the degreased steel sheet by means of an electrostatic gun and cured by stoving for 30 minutes at 200° C. The coating film, 50 μm thick, thus obtained had good flow properties, was semi-matt, had a gloss of 68%, an elasticity of 5.5 mm according to the Erichsen cupping test, a direct and indirect impact strength of 120, a pencil hardness of 3H and excellent resistance to solvents. The stoved film did not contain an excess of carboxyl groups.

(8) 750 parts of a hydroxyl-terminated polyester resin containing hydroxyl groups and synthesised from aromatic dicarboxylic acids and dihydric aliphatic alcohols (ALFTALAT 9992/1 made by Messrs. Hoechst Sara S.p.A) having an OH number of about 55 and a melting point of 75° to 85° C., 170 parts of a polyurethane prepolymer containing carboxyl groups and derived from an aromatic polyisocyanate, the isocyanate groups of which have been blocked with ε-caprolactam, with an acid number of about 10, less than 0.5% of free NCO, about 15.8% of total NCO and a melting point of about 80° C. (Additol VXL 9935 of Messrs. Hoechst Sara S.p.A), 30 parts of the resin Additol VXL 1524 referred to in Example 7 and 50 parts of a silicone-free flow agent based on polyacrylate (Additol VXL 9996 of Messrs. Hoechst Sara S.p.A) were well blended and homogenized in an extruder at 90° to 100° C. to yield a clear unpigmented coating composition. After cooling, the extruded material was processed as described in Example 1, i.e. ground in a mill and additionally screened, so as to yield a powder coating composition with a particle size of less than 100 μm and applied to a degreased steel sheet with an electrostatic gun at 10 to 90 KV. The layer was then stoved at 190° C. for 20 minutes. The resulting film showed fairly good gloss, direct and indirect impact strength 160 and passed the conical mandrel flexibility test. The stoved film contained an excess of 0.25% carboxyl groups.

(9) 430 parts of the hydroxy-terminated saturated polyester resin referred to in Example 2 (melting point 80° to 90° C., OH number 50 to 60) were mixed with 120 parts of a polyurethane prepolymer containing carboxyl groups and further containing isocyanate groups blocked with ε-caprolactam, based on a cycloaliphatic polyisocyanate, with an acid number of about 10, a content of less than 0.5% of free NCO, a total NCO content of 14.6% and a melting point of about 75° C., 10 parts of the flow agent referred to in Example 1, 3 parts of benzoin, 337 parts of TiO$_2$-R-85 and 100 parts of barium sulfate, homogenized, extruded, ground, sieved and applied. The film was stoved at 190° C. for 30 minutes. The film then had a gloss of more than 90%, a direct and indirect impact strength of 120, good resistance to solvents and passed the conical mandrel flexibility test. The stoved film contained 0.04% carboxyl groups.

We claim:

1. A solid polymer binder for thermosetting powder coating compositions comprising a combination of (A) a polyurethane prepolymer containing carboxyl groups and derived from polyisocyanates, hydroxycarboxylic acids and blocking agents different from oximes, containing from 1 to 40% by weight of blocked isocyanate groups and having an acid number in the range from 1 to 80, with (B) at least one compound selected from the group consisting of homo- and heterofunctional compounds either containing hydroxy groups or being capable of producing hydroxy groups, component (B) being present in an amount such that cross-linked products are formed under stoving conditions, in which the content of COOH-groups is not higher than 1.5% referred to the weight of components (A) and (B).

2. A solid polymer binder as claimed in claim 1, wherein the content of COOH-groups is not higher than 1.0 percent referred to the weight of components (A) and (B).

3. A solid polymer binder as claimed in claim 1, wherein the content of COOH-groups is not higher than 0.718% referred to the weight of components (A) and (B).

4. An article coated with a thermosetting powder coating composition comprising a homogeneous mixture of (I) a solid polymer binder comprising a combination of (A) a polyurethane prepolymer containing carboxyl groups, formed by the following reaction

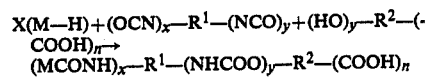

wherein

M—H is a blocking agent different from oximes and containing one active hydrogen atom which is capable of reacting with an isocyanate, R$^1$ and R$^2$ are aliphatic, cycloaliphatic or aromatic groups and x,y and n are equal or different integers being at least 1 and at most 15 and altogether at most 30 and containing from 1 to 40% by weight of blocked isocyanate groups and having an acid number in the range from 1 to 80, the residual amount of free isocyanate groups not exceeding 0.5% by weight of free NCO, with (B) at least one compound selected from the group consisting of homo- and hetero-functional compounds either containing hydroxy groups or being capable of producing hydroxy groups such that in the crosslinked products the content of COOH groups is not higher than 0.718% referred to the weight of component (A) and (B), with (II) at least one additive selected from the group consisting of dyes, pigments, fillers, flow agents thixotropic agents, additional cross linking agents, catalysts and oxidation inhibitors.

5. A process for the manufacturing of coatings on a substrate wherein a powder coating composition comprising a homogeneous mixture of
(I) at least one solid polymer binder comprising a combination of (A) a polyurethane prepolymer containing carboxyl groups, formed by the following reaction $$X(M\!\!-\!\!H)+(OCN)_x\!\!-\!\!R^1\!\!-\!\!(NCO)_y+(HO)_y\!\!-\!\!R^2\!\!-\!\!(COOH)_n \rightarrow (MCONH)_x\!\!-\!\!R^1\!\!-\!\!(NHCOO)_y\!\!-\!\!R^2\!\!-\!\!(COOH)_n$$

wherein
M—H is a blocking agent different from oximes and containing one active hydrogen atom which is capable of reacting with an isocyanate,
$R^1$ and $R^2$ are aliphatic, cycloaliphatic or aromatic groups and x,y and n are equal or different integers being at least one and at most 15 and altogether being at most 30 and containing from 1 to 40% by weight of blocked isocyanate groups and having an acid number in the range from 1 to 80, the residual amount of free isocyanate groups not exceeding 0.5% by weight of free NCO, with (B) at least one compound selected from the group consisting of homo- and hetero-functional compounds either containing hydroxy groups or being capable of producing hydroxy groups with (II) at least one additive selected from the group consisting of dyes, pigments, fillers, flow agents thixotropic agents, additional cross-linking agents, catalysts and oxidation inhibitors is applied to a substrate and then stoved at a temperature above 100° C. to yield a coating in which the content of COOH-groups is not higher than 0.718% referred to the weight of component (A) and (B).

6. An article as claimed in claim 4, wherein the prepolymer (A) contains from 7 to 20% by weight of blocked isocyanate groups.

7. An article as claimed in claim 4, wherein the prepolymer (A) has an acid number in the range from 5 to 80.

8. An article as claimed in claim 4, wherein x, y and n are equal or different integers being at least 1 and at most 10 and altogether being at most 15.

9. An article as claimed in claim 4, wherein prepolymer (A) has been produced in a manner such that those isocyanate groups of the polyisocyanate component which are not blocked, are substantially compensated by hydroxy groups such that an at least oligomeric product is formed.

10. An article as claimed in claim 9, wherein the residual amount of free isocyanate groups in component (A) does not exceed 0.5% by weight of free NCO.

11. An article as claimed in claim 4, wherein component (B) contains groups capable of reacting with carboxyl groups without formation of volatile compounds.

12. An article as claimed in claim 4, wherein as an additive an aromatic diketone is present in an amount of from 0.1 to 3% referred to the weight of the binder.

13. An article as claimed in claim 4, wherein the substrate is a metal.

14. A process as claimed in claim 5, wherein a powder composition comprising a homogeneous mixture of (I) at least one binder with (II) at least one additive selected from the group consisting of fillers, flow agents and oxidation inhibitors is applied to a metal substrate by the whirl sintering method or electrostatic powder spraying and then stoved at a temperature above 100° C.

15. A solid polymer binder for thermosetting powder coating compositions as claimed in claim 3 comprising a combination of (A) a polyurethane prepolymer containing carboxyl groups, formed by the following reaction $$X(M\!\!-\!\!H)+(OCN)_x\!\!-\!\!R^1\!\!-\!\!(NCO)_y+(HO)_y\!\!-\!\!R^2\!\!-\!\!(COOH)_n \rightarrow (MCONH)_x\!\!-\!\!R^1\!\!-\!\!(NHCOO)_y\!\!-\!\!R^2\!\!-\!\!(COOH)_n$$

wherein
M—H is a blocking agent different from oximes and containing one active hydrogen atom which is capable of reacting with an isocyanate,
$R^1$ and $R^2$ are aliphatic, cycloaliphatic or aromatic groups and
x,y and n are equal or different integers being at least 1 and at most 15 and altogether being at most 30 and containing from 1 to 40% by weight of blocked isocyanate groups and having an acid number in the range from 1 to 80, the residual amount of free isocyanate groups not exceeding 0.5% by weight of free NCO, with (B) at least one compound selected from the group consisting of homo- and hetero-functional compounds either containing hydroxy groups or being capable of producing hydroxy groups, component (B) being present in an amount such that cross-linked products are formed under stoving conditions, in which the content of COOH-groups is not higher than 0.718% referred to the weight of components (A) and (B).

* * * * *